Patented July 1, 1924.

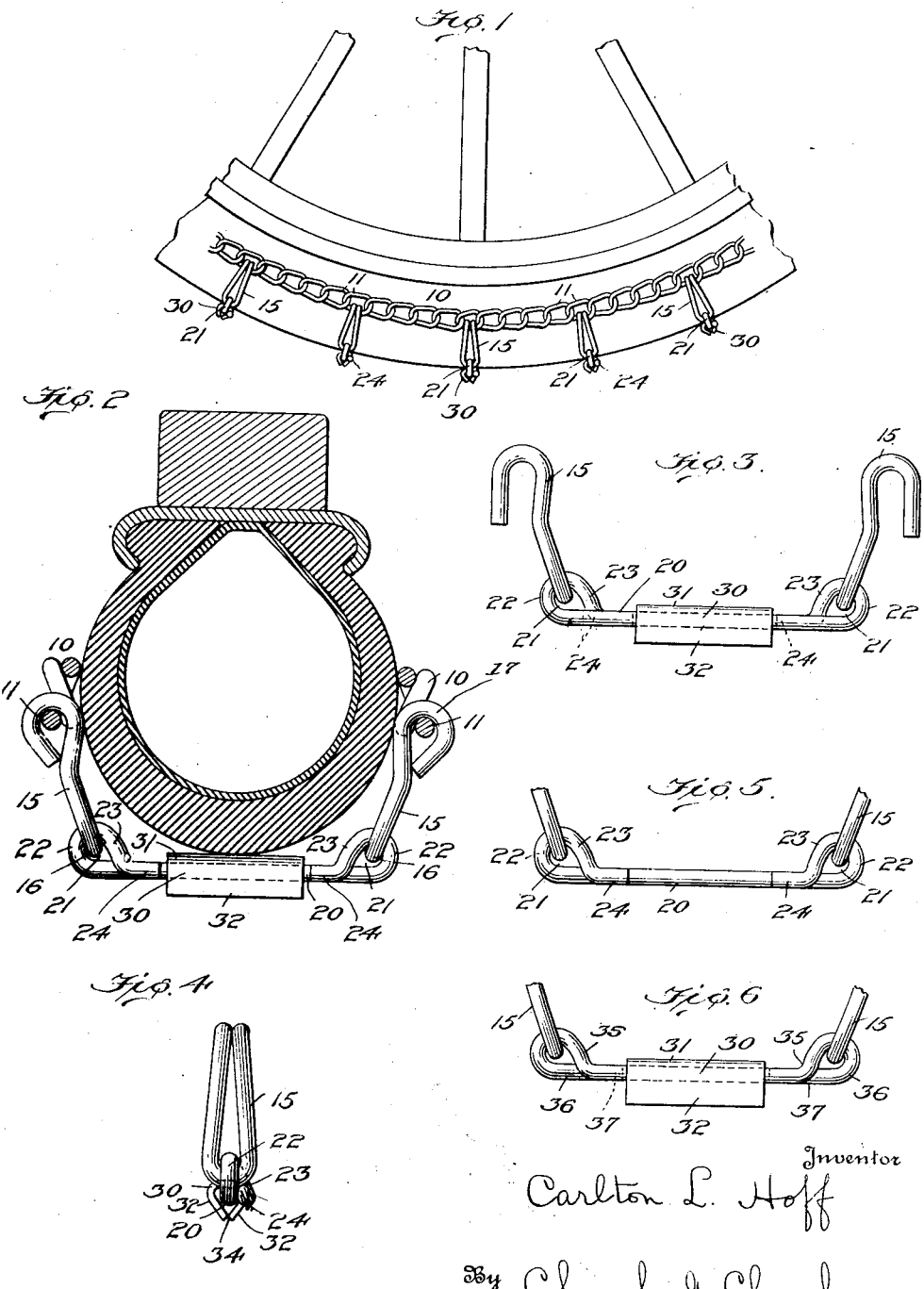

1,499,579

UNITED STATES PATENT OFFICE.

CARLTON L. HOFF, OF YORK, PENNSYLVANIA.

TREAD GRIP.

Application filed April 21, 1923. Serial No. 633,734.

*To all whom it may concern:*

Be it known that I, CARLTON L. HOFF, a citizen of the United States, residing at York, in the county of York and State of Pennsylvania, have invented certain new and useful Improvements in Tread Grips; and I do hereby declare the following to be a full, clear, and exact description of the same, reference being had to the accompanying drawings, forming part of this specification.

This invention relates to anti-skid devices such as are used on automobiles of all kinds and has for its principal object the provision of a tread grip which will have longer life, be more effective and of less cost, than devices now available.

An important factor of the present invention lies in the provision of a loosely mounted sheet steel sleeve surrounding the cross bar of the tread grip to relieve the cross bar of a great portion of the wear that would otherwise be borne by this member and at the same time form an effective traction increasing or anti-skid member between the tire and roadway.

It is not new at the present time to provide a tread grip employing a cross bar provided with a rotary member but as far as I am aware no angular steel sleeve has been provided on a cross member of an anti-skid device which would permit the sleeve to turn on its support when the sleeve is away from the ground but which is held against rotation when performing its operative function in contact with the road, this useful effect being obtained in the present instance by having the sleeve non-circular in cross section and preferably having the shape of a hollow isosceles prism.

A number of chains provided with such isosceles prisms have been tested under very severe conditions and it has been found that the sleeves, which are preferably made of an excellent grade of high carbon steel, merely oscillate when in contact with the ground and tire, presenting almost invariably a corner to the pavement and a flat side to the tire. As each tread grip passes to the top of the tire as the latter is rotated the sleeve will be free, since the cross member is not tightly held against the tire and the sleeve will change its position about its support so as to present different corners or sides to the roadway thus distributing the wear evenly about the prism.

The cross bar without the sleeve is itself a tread grip member and is an improvement over existing cross bars in that the wear is distributed partly to the center section of the bar and partly to the two ends which are reversed on themselves to form eyes embracing the usual hooks. A very important feature of the preferred form of cross bar shown in the drawings lies in its cheapness of manufacture, the eyes being formed in a single operation whereas in all forms of cross bars with which I am familiar including the modified form shown in the present drawings two operations are necessary to form the loops or eyes.

In the drawings,—

Figure 1 is a side elevation of a portion of an automobile wheel showing a chain employing my improved tread grip in position on the tire.

Fig. 2 is a vertical section through the wheel, tire, and chain.

Fig. 3 is preferred form of my tread grip member including the sleeve.

Fig. 4 is an end view of the parts shown in Fig. 3.

Fig. 5 is a view of the cross bar shown in Fig. 3 but omitting the sleeve, the cross bar itself forming the complete tread grip.

Fig. 6 is a modified form of tread grip including the reinforcing sleeve.

The anti-skid chain shown in Fig. 1 is similar in appearance to many of the chains now in general use consisting of a plurality of side chains 10 of the usual standard links 11 and carrying a considerable number of transverse or cross members each preferably consisting of a pair of hooks 15 of the usual type embracing the eye of my improved cross bar at the center 16 of the hook and embracing a link 11 of one of the chains 10 by its hooked end 17.

The specific cross bar of my present invention in its preferred form as shown in Figs. 3 and 5 consists of a single rod of a high grade steel having a straight central portion 20 continued out to a point near the center of the eyes 21 and then bent upwardly as at 22 and then downwardly as at 23 to form a closed loop, the end 24 when the loop is finished lying parallel to and in front of the center portion 20 as seen in Fig. 5 so that the axis of the end 24 will be at the same distance from the axis of the wheel and tire as is the axis of the center portion 20 of the rod from which the cross bar is made.

As is apparent from Fig. 5 the two ends 24 will contact with the ground, when the device is in use, at the same time as does the center portion 20 of the cross bar or link so that the wear will be shared by the center and ends. I find it preferable although not at all essential to mount the cross bars on the side chains so that the ends 24 will come in contact with the ground before the center portion 20; in other words, I place the ends 24 so that when they are at the bottom of the wheel or tire they face toward the rear of the vehicle so that the ends of the cross bar wear more than the center portion of the link, retaining the strength of the center portion of the cross bar for a materially greater time. An additional advantage in this construction lies in the fact that should the wheel lose traction by spinning the cross bars will tend to rock thereby presenting an edge, so to speak, to the roadway. In other words the ends 24 will tend to dig into the roadway and so greatly increase the traction of the wheel.

The cross bar shown in Fig. 3 is reinforced by a sleeve 30 preferably formed of a substantially rectangular sheet of steel bent twice through an angle of 120° so as to form a hollow prism having a cross section of the shape of an isosceles triangle having a base 31 and two sides or legs 32. The edges of the sheet metal plate from which the sleeve is made are butted together as at 34 to close the prism and form one of the three corners of the sleeve. While the edges at 34 are shown sharp in Fig. 4 it has been found that the sleeves in use soon close the joint at 34 and that after one of my sleeve type tread grips have been in use for as much as a hundred miles on hard pavements it is almost impossible to find the joint 34 from the outside of the sleeve, the joint at this time having the appearance of a welded seam.

The size of the triangular central space inside of the hollow sleeve is preferably such as to permit free angular shifting of the sleeve on the central portion 20 of the cross bar when the sleeve is thrown away from the tire by the centrifugal action of the wheel and the prism is preferably of such length as to fit loosely between the two coaxial ends 24 of the cross bar whereby a sufficient lateral movement of the sleeve is permitted to prevent any possibility of binding or locking of the parts.

Of the different designs tested I find a cross bar a little over four inches between the centers of the eyes to be extremely satisfactory with a sleeve of approximately two inches in length and slightly over a half inch from corner to corner. It must be borne in mind that these figures are descriptive merely and the invention is not to be considered as limited to these approximate figures in any way nor to the shape and style of either the cross bar or the sleeve save as defined in the claims, as a loose sleeve having faces of any character would serve the purpose although naturally not as efficiently as the preferred type illustrated.

From many observations and tests and by examination of the imprint made by the tread members in relatively hard ground I believe that engagement of the sleeve with the ground is practically invariably made at the edge or corner of the prisms at which time the flat side opposite the corner is engaged with the tire, which although of rubber is substantially unyielding to the extent that when the sleeve is in engagement with a hard pavement directly below the axle the tire itself is not fully in engagement with the ground but rides over the successive sleeves as over small stones of approximately the same size as the sleeves.

I have used chains equipped with tread grip members exactly as illustrated in combination with cross chains of the well known Weed-type, and find that my treads will outwear as many as three of the welded chain type. There appears to be no tendency on the part of my sleeves to rotate when in contact with the tire and ground. If the sleeves were made cylindrical and the side chains 10 were fairly tight the sleeves would rotate, but I do not intend that my side chains 10 shall grip the tire with spring tension, but on the contrary I prefer to mount the two side chains 10 fairly loosely so that the anti-skid chain as a whole will creep slowly with respect to the tire.

The modified form of cross bar shown in Fig. 6 is generally quite similar to the form shown in Figs. 3 and 5 but is somewhat more expensive to make inasmuch as it is necessary to perform two operations, one to bend the link upwardly as at 35 and the other to bend the end of the link to form the closed loop or eye as 36. In the modified type, as in the preferred type, the ends here numbered 37 are made coaxial one with another and parallel to the axis of the center portion of the rod.

What I claim is:

1. In an anti-skid device, a plurality of side chains, a plurality of transverse cross bars connecting said chains, and a non-cylindrical member loosely mounted to oscillate on each of said cross bars.

2. In an anti-skid device, a plurality of side chains, a plurality of transverse cross bars connecting said chains and a hollow prism sleeve loosely mounted on each of said cross bars, said sleeves being triangular in cross section.

3. In an anti-skid device, a plurality of side chains, a plurality of transverse cross bars connecting said chains, and a sleeve loosely mounted on each cross bar, each sleeve having a plurality of angular corners.

4. In an anti-skid device, a plurality of side chains, a plurality of transverse cross bars connecting said chains, a sleeve loosely mounted on each cross bar, each sleeve having a plurality of acute angle corners, and means on each of said cross bars for limiting lateral movement of said sleeves.

5. In an anti-skid device, a plurality of side chains, a plurality of transverse cross bars connecting said chains, a sleeve loosely mounted on each cross bar, each sleeve having a plurality of acute angle corners, means on each of said cross bars for limiting lateral movement of said sleeves each of said sleeves consisting of a sheet of high carbon steel bent twice to an angle of sixty degrees to form a hollow isosceles prism.

6. In an anti-skid device, a plurality of side chains, a plurality of transverse cross bars connecting said chains, a sleeve loosely mounted on each cross bar, each sleeve having a plurality of acute angle corners, and means on each of said cross bars for limiting lateral movement of said sleeves, each of said cross bars comprising a single rod bent near its ends to form eyes and with its extremities parallel to the central portion of the bar and at the same distance from the axis of the wheel and tire.

7. In an anti-skid device, a plurality of side chains, a plurality of transverse cross bars connecting said chains, a sleeve loosely mounted on each cross bar, each sleeve having a plurality of acute angle corners and means on each of said cross bars for limiting lateral movement of said sleeves, each of said cross bars comprising a single rod bent near its ends to form eyes and with its extremities parallel to the central portion of the bar and at the same distance from the axis of the wheel and tire, the central portion of said rod as it forms the loop of the eye being tangent to said loop and the extremity of the rod making an obtuse angle with said loop.

8. In an anti-skid device, a plurality of side chains, a plurality of cross bars connecting said chains, a sleeve loosely mounted on each cross bar, and reversely directed ends on said cross bars parallel to the central portion thereof forming stops to limit endwise movement of said sleeves.

9. In an anti-skid device, a plurality of side chains, a plurality of transverse cross bars connecting said chains, each of said cross bars comprising a single rod bent near its ends to form eyes and with its extremities parallel to the central portion of the bar and at the same distance from the axis of the wheel and tire.

10. An anti-skid device, a plurality of side chains, a plurality of transverse cross bars connecting said chains, each of said cross bars comprising a single rod bent near its ends to form eyes and with its extremities parallel to the central portion of the bar and at the same distance from the axis of the wheel and tire, the central portion of said rod as it forms the loop of the eye being tangent to said loop and the extremity of the rod making an obtuse angle with said loop.

11. An anti-skid device, a plurality of side chains, a plurality of transverse cross bars connecting said chains, each of said cross bars comprising a single rod bent near its ends to form eyes and with its extremities parallel to the central portion of the bar and at the same distance from the axis of the wheel and tire, the central portion of said rod as it forms the loop of the eye being tangent to said loop and the extremity of the rod making an obtuse angle with said loop, the extremities of said rod when formed being coaxial.

12. In an anti-skid device, a plurality of side chains, a plurality of cross bars connecting said chains, a sleeve loosely mounted on each cross bar, and reversely directed coaxial ends on said cross bars forming stops to limit endwise movement of said sleeves.

CARLTON L. HOFF.

Witnesses:
R. M. JOHNSTON,
G. G. MANGLE.